Figure 1:
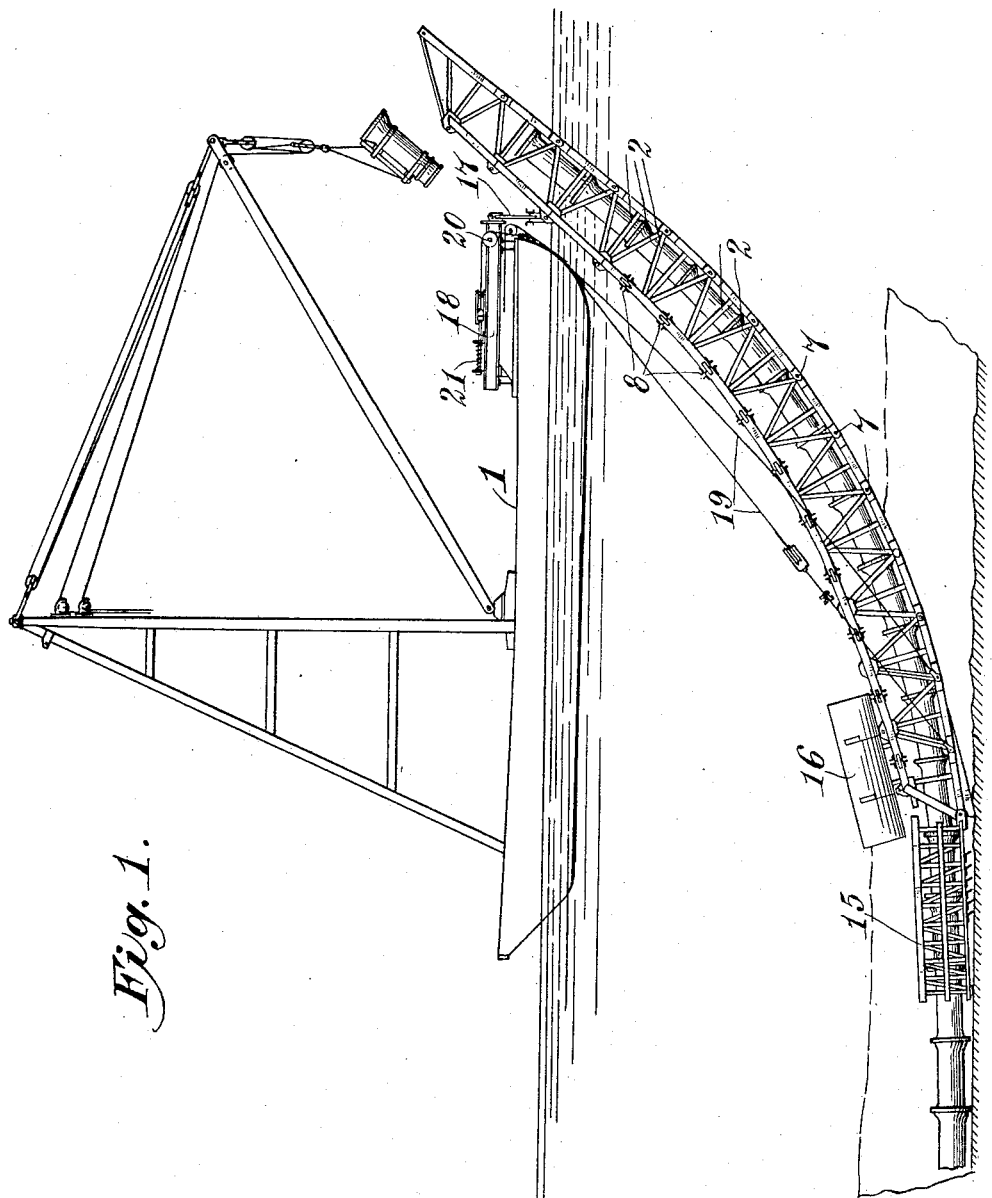

W. L. CHAPMAN.
PIPE LAYING APPARATUS.
APPLICATION FILED JULY 13, 1916.

1,220,189.

Patented Mar. 27, 1917.
4 SHEETS—SHEET 1.

INVENTOR.
William L. Chapman
BY
Emery, Booth, Janney & Varney
ATTORNEYS

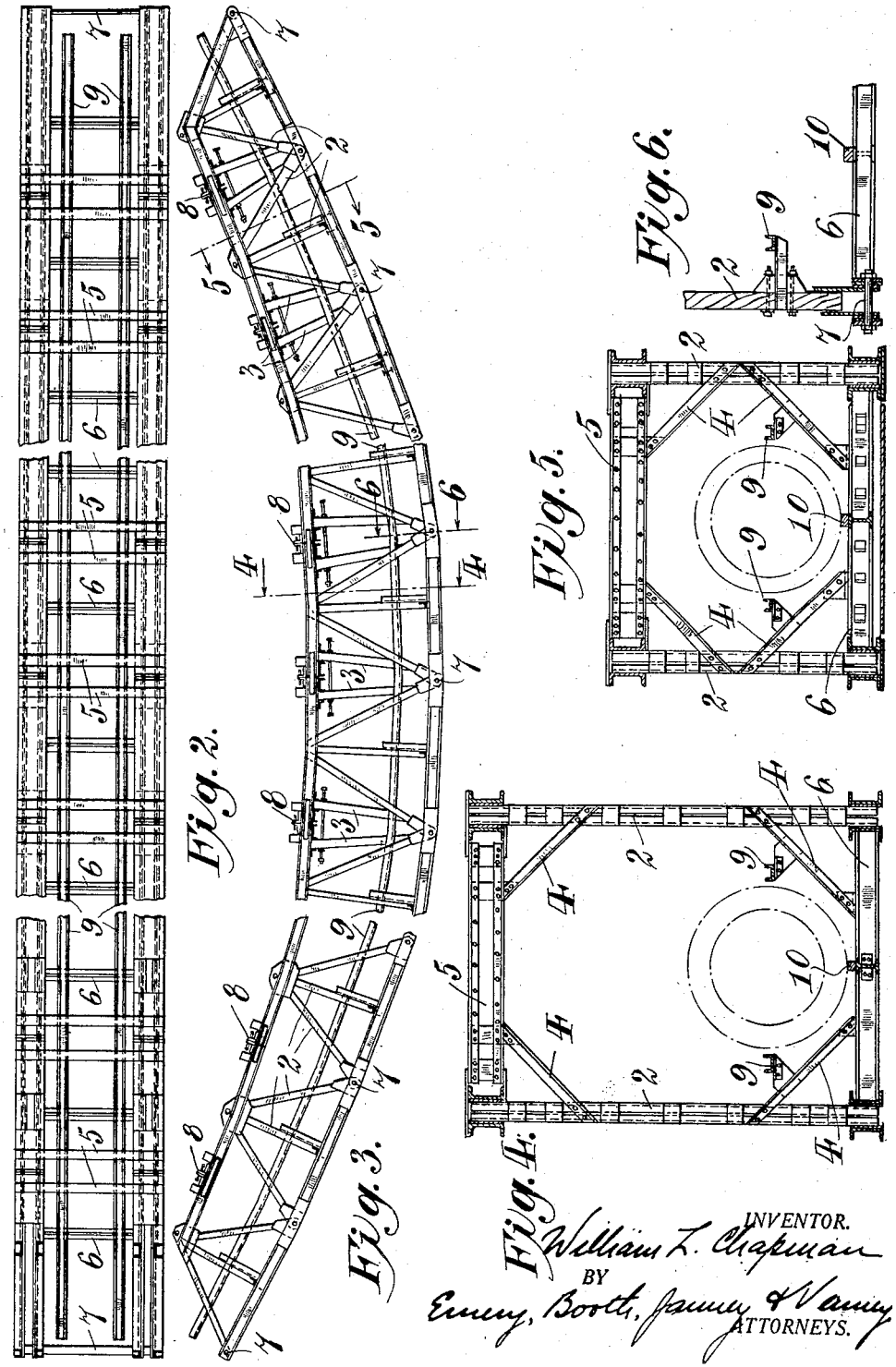

W. L. CHAPMAN.
PIPE LAYING APPARATUS.
APPLICATION FILED JULY 13, 1916.
1,220,189.
Patented Mar. 27, 1917.
4 SHEETS—SHEET 3.
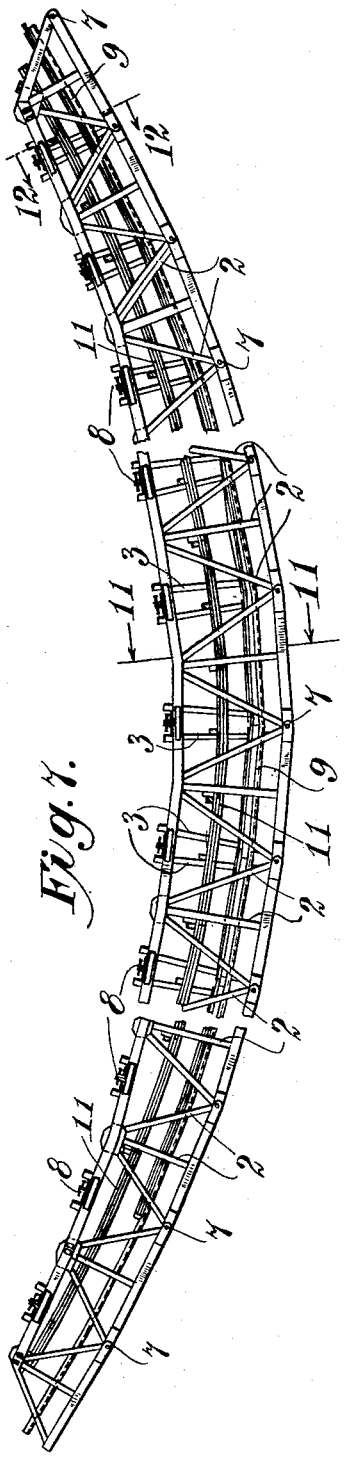
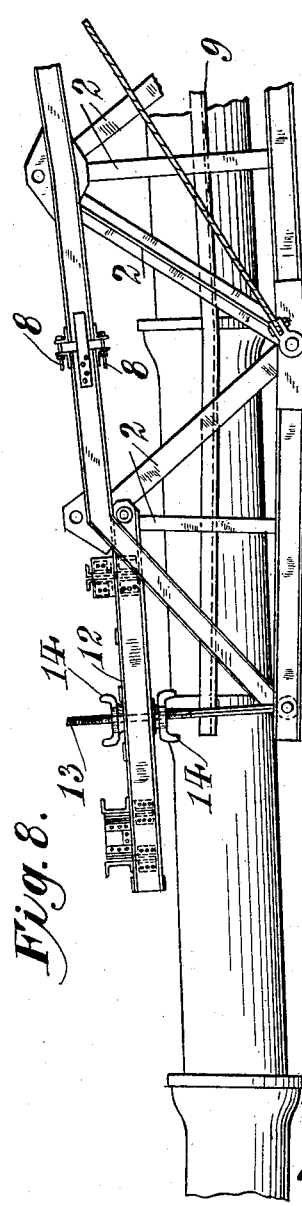
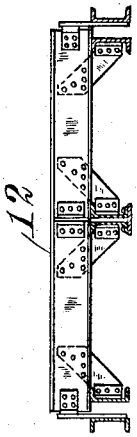
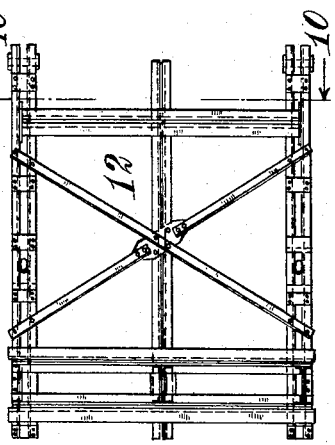
INVENTOR.
William L. Chapman
BY
Emery, Booth, Janney & Varney
ATTORNEYS.

W. L. CHAPMAN.
PIPE LAYING APPARATUS.
APPLICATION FILED JULY 13, 1916.
1,220,189.
Patented Mar. 27, 1917.
4 SHEETS—SHEET 4.
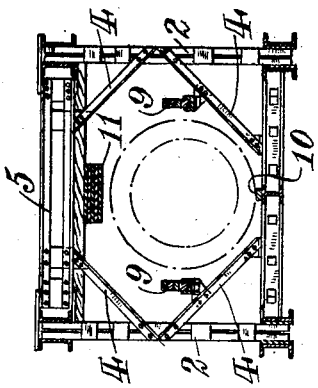
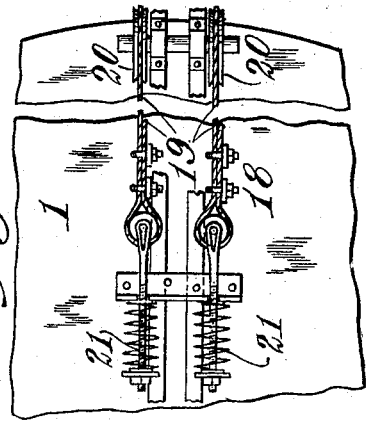
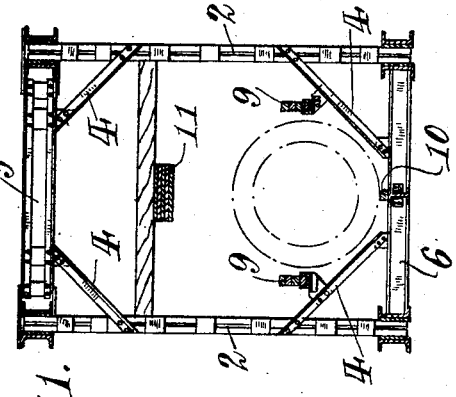
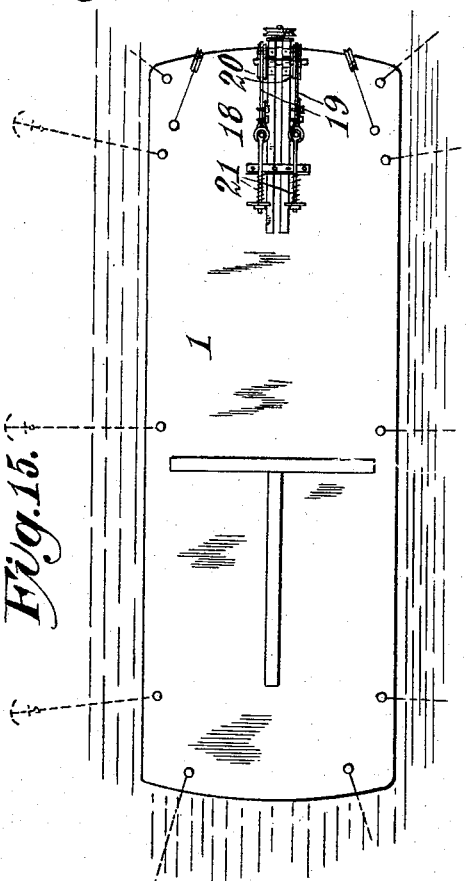
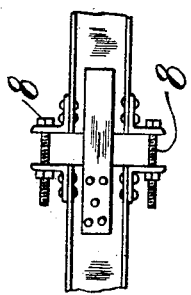
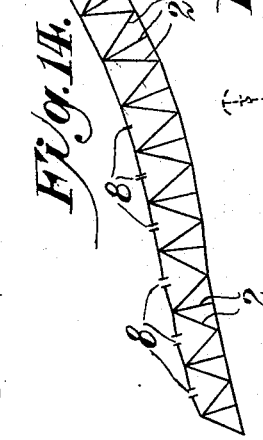
INVENTOR.
William L. Chapman
BY
Emery, Booth, Janney & Varney
ATTORNEYS.

UNITED STATES PATENT OFFICE.

WILLIAM L. CHAPMAN, OF BROOKLYN, NEW YORK.

PIPE-LAYING APPARATUS.

1,220,189.            Specification of Letters Patent.     Patented Mar. 27, 1917.

Application filed July 13, 1916. Serial No. 109,034.

*To all whom it may concern:*

Be it known that I, WILLIAM L. CHAPMAN, a citizen of the United States, and a resident of the borough of Brooklyn of the city of New York, in the State of New York, have invented an Improvement in Pipe-Laying Apparatus, of which the following is a specification.

The improvements relate more particularly to that type of pipe laying apparatus in which a launching skid or cradle is provided for supporting a line of pipe while sliding it into position upon the bed of a stream or other body of water or, in fact, into any position where it is inconvenient or impossible to unite the pipe sections *in situ*.

In the accompanying drawings, in which I have illustrated a practical embodiment of my invention, Figure 1 is a view in side elevation showing the launching skid and its associated parts in relation to a scow which constitutes a support therefor, Fig. 2 is a broken plan view of the launching skid with some of the parts, such as the towing cables, omitted, Fig. 3 is a view of the same parts shown in Fig. 2, in side elevation, Fig. 4 is a transverse section of the skid, the plane of the section being indicated by the line 4—4 in Fig. 3, Fig. 5 is a transverse section of the skid, the plane of the section being indicated by the line 5—5 in Fig. 3, Fig. 6 is a detail section of the skid, the plane thereof being indicated by the line 6—6 in Fig. 3, Fig. 7 is a broken elevation of a different form of launching skid embodying the invention, Fig. 8 is a view in elevation, on a larger scale, showing the lower end of the skid provided with a different form of straightener device for the pipe than that shown in Fig. 1, Fig. 9 is a plan view of said straightener device attached to the lower end of the skid as shown in Fig. 8, Fig. 10 is a detail section of said straightener device, the plane of the section being indicated by the line 10—10 in Fig. 9, Fig. 11 is a transverse section of the form of skid shown in Fig. 7, the plane of the section being indicated by the line 11—11 in Fig. 7, Fig. 12 is also a transverse sectional view of said form of skid, the plane of section being indicated by the line 12—12 in Fig. 7, Fig. 13 is an enlarged detail of a loose adjustable fastening device employed to unite the sections of the skid together, Fig. 14 is a diagrammatic view of the skid illustrating the flexibility thereof due to said loose fastening devices for the sections, Fig. 15 is a plan view of the scow with the anchoring devices therefor indicated in dotted lines, and Fig. 16 is a detail plan on an enlarged scale of the forward end of the scow.

The apparatus substantially as shown in the accompanying drawings was actually used by me recently in the construction of a pipe line across the "Narrows" of New York harbor to connect the Brooklyn and Staten Island water supply systems. As so used, a trench (indicated by the dotted lines in Fig. 1) was first dredged from the Brooklyn end to the Staten Island end, the trench following the course which the pipe line was to take and providing a channel below the level of the harbor bottom for the pipe to rest in when laid.

The view of Fig. 1 of the drawings represents the apparatus as it would appear in mid-stream, that is to say in deep water, as distinguished from the shallow approaches at each end of the line. In this position, the launching skid was supported, as shown, from the forward end of a derrick scow 1 which was suitably anchored as indicated in Fig. 15.

When, however, at the commencement of operations the pipe was laid at the Brooklyn end, the shallow water there necessitated supporting the skid almost horizontally. Moreover, it was necessary to have the skid relatively shorter than as shown in Fig. 1, lengthening it successively as the work progressed into deeper water.

For this purpose, and also for the purpose of giving a certain degree of flexibility to the skid, it was constructed of a plurality of sections any number of which might be conveniently added or removed to accommodate the skid to different depths.

As shown in the drawings, each of these sections of the skid consists of a box-like member or frame having side members, such as trusses 2 and 3, transverse braces 4, and cross pieces 5 and 6 along the top and bottom respectively, the several sections being hinged together at the bottom by pivotal connections 7 and loosely connected at the top by adjustable bolt or pin connections 8.

This construction provides a strong rigid unit section which is so proportioned as to be a little longer at the base than at the top whereby, when the sections are united to form the skid and the latter is supported at its upper end with its lower end resting upon the bed of a stream or the like, it will take a curvilinear shape, as shown in Figs. 1, 3 and 7 for instance. At the same time, on account of the loose connections between the sections at the top (see Fig. 13) the skid may be flexed at any point (as for instance at the lower end as shown diagrammatically in Fig. 14) to accommodate it to any unevenness in the river bottom, or to permit it to be straightened out, as when it is desired to rest the entire skid in a flat horizontal position.

Extending substantially the entire length of the skid are side guideways 9 and a bottom guideway 10 for the line of pipe. These are clearly indicated in Figs. 4 and 5 where the pipe is shown relatively thereto in broken lines. Moreover, from these two figures, it will be seen that the skid has a greater vertical depth near the center than near the ends, which construction obviously gives the skid a maximum strength at the center where the strain is the greatest.

Preferably also, I provide a top guideway 11 as shown in Figs. 7, 11 and 12. The object of this top guideway is to prevent the pipe from lifting or otherwise getting out of alinement when the skid is advanced in accordance with the operation of pipe laying to be explained presently. If the top guideway be not provided, I have found that the tendency of the pipe to lift as the skid is advanced strains the joints and places them under uneven tension and generally interferes with the smooth working of the apparatus. Moreover, it will be seen that the tendency of the pipe to straighten will lift the skid slightly with the pipe therein, all of which is permitted by the flexible connection of the skid to the scow. The pipe should not only be supported upon the bottom guideway of the skid but it should be caused to retain its uniform curved shape while within the skid.

As the pipe leaves the lower end of the skid, it is desirable that the joints be straightened out so that the pipe will lie perfectly flat; and for this purpose I prefer to use a trailing straightener or leveling device 15 as shown in Fig. 1. I have made this particular trailing straightener with its associated parts the subject of a companion application, Serial No. 109,033 filed July 13, 1916. I shall refer here, therefore, to another form of straightener which I have shown particularly in Figs. 8, 9 and 10, reserving a detailed consideration of my trailing straightener for the other application to which I have just referred.

In the case of Figs. 8, 9 and 10, I show a frame 12 pivotally secured near the top part of the lower end of the skid; and at points intermediate the ends of this straightener it is supported and retained in a suitable position to engage and resist the top of the pipe and thus straighten the same, by means of a pair of clamping rods 13, one on each side. These clamping rods are pivoted respectively to the lower longitudinal members of the skid and are each provided with a pair of controlling nuts 14, one above and one below the frame whereby its position can be accurately adjusted for straightening out the degrees of curvature of the pipe therein, all as will be readily understood.

It will be understood that when the skid is in use with a line of pipe therein, it will be subjected to an enormous load. It is therefore desirable to support the lower end of the skid so as to prevent the same from sinking deeply into the soil upon which it rests. At the same time it is undesirable to have this lower end supported from the scow or other supporting device for the skid, because, since such supporting device is apt to be constantly rolling and pitching following the variations in the surface of the water in which it rests, it would cause the lower end of the skid to move in like manner and thus produce a constant lifting and settling of the pipe issuing from its lower end, as well as other undesirable effects, as will be obvious. Accordingly the lower end of the skid is left entirely free of support from the scow and is provided with a pneumatic pontoon or other buoyancy device 16 which is secured near the lower end of the skid and exerts a sufficient lifting effect to prevent the entire weight of this end of the skid from resting upon the bottom. It will be understood that the pontoon 16 which I use for this purpose may be made to have a greater or a lesser lifting effect, to meet any given conditions.

It will be observed from Fig. 1 that the upper end of the skid is supported at a point remote from the extreme end by a cable 17 which depends from a supporting frame 18 secured on front of the scow. This supporting frame and its associated parts are made the subject of a second companion application, Serial No. 109,032 filed July 13, 1916, and are more particularly described therein. The end of the skid which projects above this point of support and somewhat above the level of the scow affords a convenient mouth for receiving the sections of pipe which are delivered thereto successively by a derrick as indicated in Fig. 1 and the joints between which are successively sealed and calked while still above the water line. These joints, as will be understood, are flexible within certain limits so that as the pipe is progressively advanced or launched into its final resting place (for instance, at the bottom of the stream or other body of water) it can be straightened out as previously described.

To so launch the pipe, the skid is advanced through the medium of tow lines 19 secured one on each side near the lower end of the skid and passing around the front end of the scow over sheaves 20 and secured to cushioned fastening devices 21 (Figs. 15 and 16). In this way, as the scow is moved forward, the skid is drawn along by the tow lines 19 which pull from the lower end of the skid, that is, at the point where the line of pipe issues from it. The scow is advanced by loosening on the rear anchor lines and pulling on the forward anchor lines or in any other suitable manner; and as the scow advances, it draws along the skid, as just explained, causing the line of pipe which, of course, is in effect anchored, to be discharged from its lower end, straightened, and left in a level position in the trench along which the lower end of the skid advances.

It will be understood that the present improvements are not necessarily confined to subaqueous work.

I claim as my invention:

1. A pipe laying apparatus having a launching skid for progressively lowering pipe into position, said launching skid being made up of a plurality of rigid sections pivotally united, and means for limiting the motion of the sections relative to each other.

2. A pipe laying apparatus having a launching skid for progressively lowering pipe into position, said launching skid being made up of a plurality of rigid sections pivotally united at the bottom and loosely connected at the top.

3. A pipe laying apparatus having a launching skid for progressively lowering pipe into position, said launching skid consisting of a plurality of rigid box-shaped units flexibly united end to end to form a cradle entirely surrounding the pipe.

4. A launching skid for lowering a line of flexibly jointed pipe into position, comprising a series of rigid units flexibly joined together, and means to confine the line of pipe against vertical displacement with respect to said units as the skid is advanced.

5. A launching skid for lowering a line of flexibly jointed pipe into position, comprising sections hinged together at the bottom and flexibly connected at the top, and means to confine the line of pipe against both horizontal and vertical displacement with respect to said sections.

6. A launching skid for lowering a line of flexibly jointed pipe into position, said skid being flexibly jointed and completely surrounding the pipe, and guideways above, below and on each side of said pipe.

7. A pipe laying apparatus for subaqueous work, having a launching skid for lowering pipe into position, said launching skid being attached to a supporting device near its upper end and having a buoyancy device near its lower end, said lower end being free from vertical movement of the supporting device, whereby changes of level of the supporting device have no substantial effect upon the lower end of the skid.

8. A pipe laying apparatus for subaqueous work, having a launching skid for lowering pipe into position, said launching skid having a greater vertical depth at the center than at its ends, and means for attaching said skid near its upper end to a supporting device, said skid having a buoyancy device near its lower end, said lower end being free from vertical movement of the supporting device, whereby changes of level of the supporting device have no substantial effect upon the lower end of the skid.

9. A pipe laying apparatus having a launching skid for lowering a line of flexibly jointed pipe into position, said launching skid having means at its lower or discharging end to straighten out the pipe as it issues therefrom or changing the angle between sections as may be required.

10. A pipe laying apparatus having a launching skid for lowering a line of flexibly jointed pipe into position, and an adjustable pipe-straightening frame connected to the skid and adapted to engage the top of the pipe as it issues from the lower end of the skid.

11. A pipe-laying apparatus having a flexibly suspended launching skid for progressively lowering pipe into position, said skid having a curvilinear launchway and a top guide serving to inclose the pipe and acting as a restraining member upon the tendency of the pipe to straighten, whereby when the skid is advanced it will accommodate itself to the tendency of the pipe to straighten, and the pipe at all times will be retained within the skid.

In testimony whereof, I have signed my name to this specification this tenth day of July, 1916.

WILLIAM L. CHAPMAN.